United States Patent
Perkins et al.

(10) Patent No.: US 6,865,347 B2
(45) Date of Patent: Mar. 8, 2005

(54) OPTICALLY-BASED LOCATION SYSTEM AND METHOD FOR DETERMINING A LOCATION AT A STRUCTURE

(75) Inventors: Matthew R. Perkins, Sunrise, FL (US); Tzer-Hso Lin, Coral Springs, FL (US); Neal K. Patwari, Fort Lauderdale, FL (US); Robert J. O'Dea, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 581 days.

(21) Appl. No.: 09/755,707

(22) Filed: Jan. 5, 2001

(65) Prior Publication Data

US 2002/0089722 A1 Jul. 11, 2002

(51) Int. Cl.[7] .............................................. H04B 10/00
(52) U.S. Cl. ...................... 398/172; 398/130; 398/151
(58) Field of Search ............................... 398/151, 153, 398/156, 162, 166, 172, 137, 130; 356/141.1, 141.2, 141.3, 141.4, 141.5, 616, 617, 620, 622

(56) References Cited

U.S. PATENT DOCUMENTS

| | | | |
|---|---|---|---|
| 3,900,404 A | 8/1975 | Dachs | 250/199 |
| 5,424,859 A | 6/1995 | Uehara et al. | 359/152 |
| 5,550,434 A | 8/1996 | King et al. | 315/160 |
| 5,635,915 A | 6/1997 | Gray | 340/825.57 |
| 5,657,145 A | 8/1997 | Smith | 359/181 |
| 5,990,826 A | * 11/1999 | Mitchell | 342/357.06 |
| 6,148,211 A | * 11/2000 | Reed et al. | 455/456.2 |
| 6,198,528 B1 | * 3/2001 | Maynard | 356/141.1 |
| 6,373,978 B1 | * 4/2002 | Ishihara | 382/154 |
| 6,381,006 B1 | * 4/2002 | Ramstrom | 356/4.01 |
| 6,392,747 B1 | * 5/2002 | Allen et al. | 356/141.1 |
| 6,400,482 B1 | * 6/2002 | Lupton et al. | 398/140 |
| 6,473,038 B2 | * 10/2002 | Patwari et al. | 342/450 |

FOREIGN PATENT DOCUMENTS

| | | |
|---|---|---|
| WO | WO 99/53633 | 10/1999 |
| WO | WO 99/53732 | 10/1999 |
| WO | WO 00/30415 | 5/2000 |

* cited by examiner

*Primary Examiner*—M. R. Sedighian
*Assistant Examiner*—Dalzid Singh

(57) ABSTRACT

An optically based location system and method of determining a location at a structure include a lighting infrastructure having lights at a structure. Each light is configured to illuminate and to transmit a respective relative or absolute terrestrial position through modulation of emitted light. An optical receiver is configured to detect the lights, to demodulate the position of detected lights, and to determine from the detection a position of the receiver. The receiver can have a conventional optical detector for determining a two-dimensional position of the receiver relative to a detected light, or can have a three-dimensional spot collimating lens and charged couple device optical detector for determining a three-dimensional position of the receiver relative to a detected light. The receiver and lights can be synchronized for converting a delay time into a distance measurement to calculate a distance between a light and the receiver.

25 Claims, 6 Drawing Sheets

OPTICALLY-BASED LOCATION SYSTEM AND METHOD FOR DETERMINING A LOCATION AT A STRUCTURE

BACKGROUND OF THE INVENTION

1. Field of the Invention

The invention lies in the field of electronic location determination. The invention relates to an optically based location system and a method for determining a location at a structure.

2. Description of the Related Art

In the recent past, the Federal Communications Commission (FCC) has promulgated standards related to the Emergency-911 ("E-911") initiative. This initiative has set the initial standards for a communications system that, in the future, will precisely locate a particular person or object. Particularly, the initiative relates to precisely determining the location of a particular cellular telephone. As a result, location technologies have been developing rapidly. The rush to complete E-911, in particular, has compelled many cellular system designers to develop a scheme that will satisfy the location requirements set by the FCC.

Simultaneously, smaller-scale location opportunities, such as personal security and asset-management solutions, are being investigated. The smaller-scale location technologies present many more unsolved problems than the large-scale E-911 technology. One of the most challenging feats resides in the creation of technology that is able to locate a device within or around structures. As set forth herein, the terms "structure" or "structures" mean any enclosure, including, but not limited to, moveable enclosures, such as vehicles and robots. The terms do not necessarily include only man-made structures, such as buildings or cars, for example. An enclosure can have intermediate areas and walls. The term "areas" as used herein is defined as any subset of an enclosed space within or a defined space around a structure. An "area" can mean, for example, a small room with four walls and a door, or it can refer to a large room with many walls and doors and with intermediate cubicle-type half-walls. An "area" can also mean, for example, places adjacent a vehicle.

Equipment that uses radio frequency ("RF") signals to capture Receive Signal Strength ("RSS"), Time Difference of Arrival ("TDoA"), or Angle of Arrival ("AoA") clues have limited location accuracy and often require an expensive supporting infrastructure. RF location schemes such as RADAR, GPS, and LORAN have been used for years to locate people and/or objects outdoors. The realities of the indoor environment prevent RF schemes from being employed indoors. Specifically, when RF propagates in a building, the transmitted signal undergoes fading, dispersion, and interference with delayed versions of itself—otherwise known in the art as multipath interference. Such signal impediments make it extremely difficult to configure an indoor RF location system employing RSS, TDoA, or AoA for estimating a location of an object.

In most cases, existing optical in-building infrastructure includes already-installed lights, such as incandescent bulbs, fluorescent lamps, and halogen bulbs, or even LED's or laser diodes. These definitions for the term "light" or "lights" are not exclusive. A "light" can refer to any device used for visible light illumination or invisible light transmission, including, but not limited to, ultraviolet and infrared. Other existing devices include sensors, RF transceivers, and processors that can perform position estimates based on signal strength or some other ranging technology.

Various prior art devices and methods have used lighting for sending information in addition to providing illumination. The first four paragraphs of the background section of International PCT publication WO 99/53732 to Leeb et al. detail the progression of such devices and methods over the past few decades. These paragraphs are hereby incorporated herein by reference. None of the cited patents, however, provide the features of the invention.

For example, WO 99/53732 discloses an apparatus for modulating electromagnetic radiation to transmit information from a visible-light generating lamp such that human-perceptible flicker is eliminated regardless of the information content. WO 99/53732 does not address or disclose a system for locating an object in a building or using an optical detector in a system for locating an object in a building.

Additionally, International PCT publication WO 00/30415 to Lupton et al. discloses an electronic communications network that uses indoor fixtures, emitting modulated visible light, as transmitters that do not generate human-perceptible flicker. Using warning indicators, i.e., a speaker, the WO 00/30415 receiver indicates to a patient wearing the receiver whether or not that patient is within an authorized area. The WO 00/30415 photocell does not and cannot calculate its physical position with respect to a received light source based on the light it receives from that source. Thus, it cannot calculate a distance from a particular light source. The WO 00/30415 device also does not determine a relative or absolute position of a user from the light it receives. Further, WO 00/30415 only determines detectability within a given range from a light source.

Finally, International PCT publication WO 99/53633 to Hovorka et al. discloses a communications network similar to WO 00/30415 having an improved bandwidth using a particular coding scheme.

DESCRIPTION OF THE PREFERRED EMBODIMENTS

Figure 1:
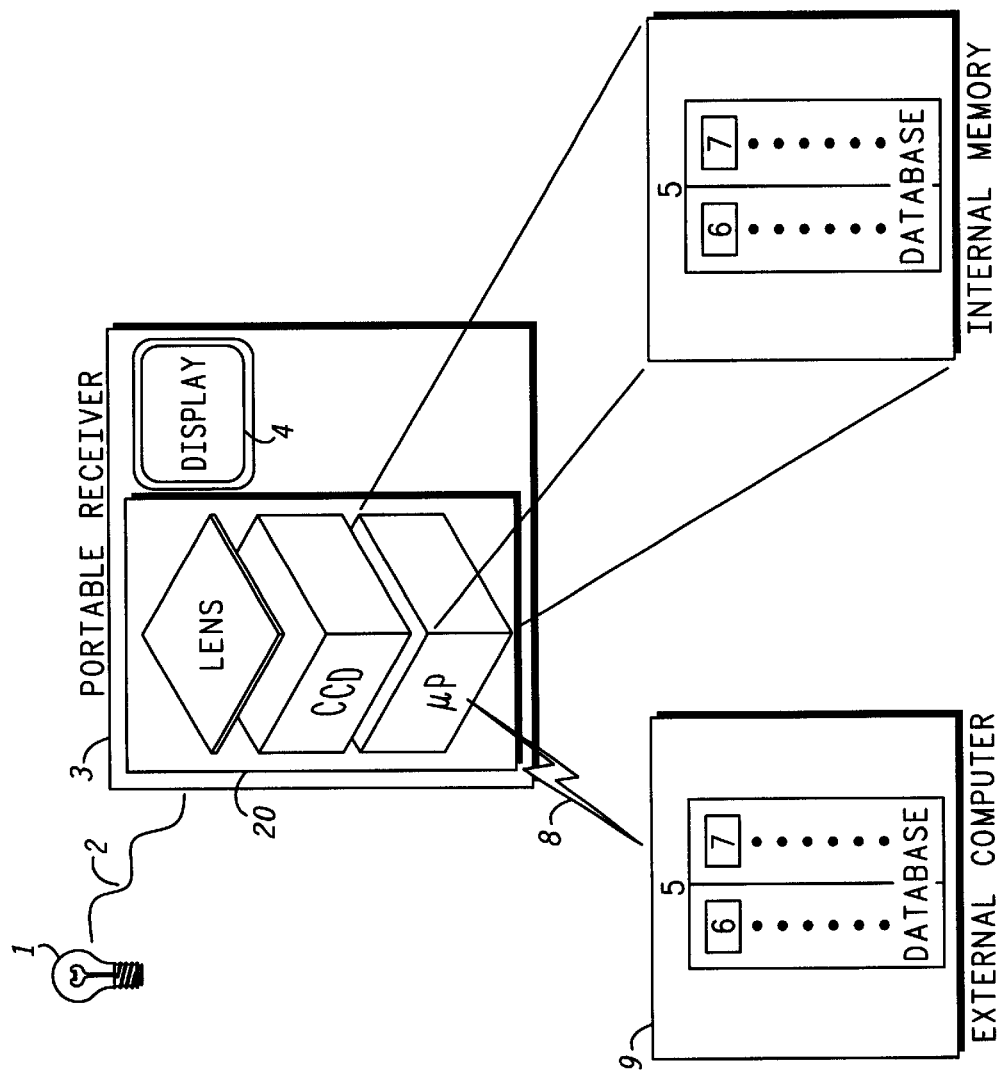
FIG. 1 is an illustrative block diagram of the overall architecture according to the invention.

It is often forgotten that indoor environments were constructed to minimize audio and optical interference. Walls were erected and doors were installed to keep in-building conversations private and to substantially prevent light from dispersing from one area to another. A typical building, for example, is configured such that room A has one light source and room B has another light source. Thus, the light emitting from each respective source (e.g., the transmitted signal) cannot interfere with light emitting from another source. On the other hand, if RF sources (transmitters) are used, multiple signals originating from one area can and do interfere with each other and also with signals originating from other areas, including areas behind walls. When RF sources are used with in-building location detection systems, the interference skews a location sought to be estimated.

Instead of applying RF signals for determining location, the present invention uses optical signal technology in a unique way to determine the location of an object at a structure using an existing lighting infrastructure within or around that structure. The present invention utilizes optical technology to keep the location-determining signals from interfering with each other and uses the particular features of indoor environments to enhance the reliability of determining a location of an object within a structure. The system and method of the present invention adds value to the existing infrastructure by providing a position reference to a location map that is created by the devices in the infrastructure. For a lighting infrastructure, for example, each light can have a relative position defined with respect to a fixed position, such as an entrance to the building. Alternatively or additionally, the example can be extended to provide an absolute terrestrial position reference to the location map created by the infrastructure. If the absolute terrestrial location of the entrance, for example, is defined, each light can have a relative position defined with respect to that absolute location and, therefore, an absolute position of that light can be determined. Alternatively, each light can have its own absolute terrestrial position as the reference.

As set forth herein, the terms "absolute terrestrial position" or "absolute position" mean a three-dimensional position relative to a predetermined coordinate system, for example, the coordinate system of the Earth, including positions on the Earth's surface, below the Earth's surface, and above the Earth's surface. Thus, an example absolute terrestrial position could include latitude, longitude, and height above/below sea level. Another example could include an X-Y-Z position with respect to the center of the Earth. Another example could include a country, state, city, address, and height above/below sea level. Those having skill in the art can derive further equivalent examples.

Most location solutions have to combat the maladies of in-building environments. In contrast, the invention exploits in-building isolation properties and existing in-building transmission infrastructures, and components of those infrastructures, to provide a unique and robust indoor location solution that has not heretofore existed.

The present invention employs an optically enabled location system that utilizes a building's existing indoor lighting infrastructure and conventional optical receivers. The invention also can employ a unique three-dimensional ("3-D") optical detector (receiver) that determines its own position relative to a light source, also called an illumination element. Particularly, the 3-D receiver "sees" a given light and determines a position relative to that light source using, in particular, a location vector. The invention further determines the identity of that given light source and, when the light source is identified, determines the light source's relative position with respect to a fixed point or the light's absolute location with respect to the Earth. Given the relative position of the receiver from the light source and the light source's absolute position, for example, an absolute position of the receiver can then be determined with a great degree of accuracy. Thus, the invention presents a location system that overcomes problems associated with RF-based location systems. The invention side-steps RF-signal impediment issues by employing a media that is not as susceptible to the aforementioned channel impediments.

The optical transmitters (light sources) and receivers of the invention provide location information to the location devices operating indoors. The receiver used in the system and method of the invention determines the receiver's own relative or absolute position with the help of only one transmitting device. Most existing location systems need at least three, and, preferably, four, transmitting devices to calculate a two-dimensional ("2-D") position. One embodiment of the receiver used in the invention is unique because it determines its own 3-D relative or absolute position using only one transmitting device. The 3-D receiver employed by the invention, however, utilizes a 2-D AoA scheme in conjunction with RSS clues to calculate its position from only one transmitting device. The receiver extracts RSS, TDoA, and 2-D AoA clues from at least one light having an optical transmitter to estimate the location of the transmitting light source and to determine the receiver's own position based on a priori knowledge of the location of each transmitter.

The transmitting infrastructure of the invention is unique in that there is little or no installation cost. The invention utilizes existing infrastructures (i.e., in-building lighting grids). In most location determining systems, a significant portion of the cost is associated with the purchase of the infrastructure and its installation. Today, it is not unheard of, for example, to install one RF base station in every room or at least in every other room in order to provide sufficient indoor coverage. The infrastructure for accommodating the system and method of the invention, however, can already be found in almost every office building.

Converting existing lighting systems to implement the invention can be performed by adding a modulation/communications device in series with some of the lighting fixtures. Preferably, the device can be part of a light ballast, and conversion can be performed by merely changing the ballast of some of the lighting fixtures. Ballast manufacturers are designing some ballasts to perform a multitude of tasks. For example, it is anticipated that future ballasts will have a unique address similar to an Internet Protocol ("IP") address. The address could be simply a unique identification code. Alternatively, the address could be a coded form of the relative position of that respective transmitter with respect to a fixed point. The address could also be the absolute terrestrial location of that respective transmitter. An example code could include latitude, longitude, and height relative to sea level. Light ballasts also have dimming capabilities and could include remote control capabilities and optical information transmission features. Thus, ballasts can be modified to include such modulation/communications devices. Alternatively, the modulation device can be added in series with an incandescent light bulb fixture. The device can be connected in series with the light bulb by having both a male and a female light bulb connection socket. The male connection of the device could be screwed into the light socket, and then the light bulb can be screwed into the female socket of the device. Preferably, each room of a structure includes at least one of such devices.

Providing that a relative or absolute location of a given light source (transmitter) is known, optical transmission can be applied to create a robust indoor location solution. If a receiver is able to determine the relative location of an optical signal source and the IP-similar address of that source, the receiver can then determines its own relative or absolute position based on a priori knowledge of the location of each transmitter at the structure at issue. Alternatively, the receiver can forward detected/derived information to a central station for further processing to determine the receiver's relative or absolute position.

The incorporation of the special receivers into the location system of the invention provides a unique method that allows each receiver to determine its own relative or absolute location with respect to the rest of the Earth. As a whole, the system of the invention provides very accurate indoor and/or outdoor location estimates at a fraction of the cost and complexity required by location systems available or known today.

The construction and method of operation of the present invention, however, together with additional objects and advantages thereof will be best understood from the following description of specific embodiments when read in connection with the accompanying drawings.

In all the figures of the drawing, sub-features and integral parts that correspond to one another bear the same reference symbol in each case.

Referring now to the figures of the drawings in detail and first, particularly to FIG. 1 thereof, there is shown a block diagram of the overall system architecture of the invention.

The light bulb 1 represents a single illumination element of a multi-element lighting infrastructure. Preferably, the lighting infrastructure is located at a building or structure. The system is not limited to interior or in-building applications. The illumination element can be located anywhere on the Earth, whether indoors or not. Preferably, the element is a fluorescent light that is controlled by a ballast causing the light to periodically transmit a unique address. The unique address can be a simple unique identification number. Alternatively, the address can be a code representing a relative or absolute terrestrial position of the light to which the code is assigned. The address does not necessarily have to be generated and controlled by a ballast. The power supplied to the light can be used to vary the illumination such that the light periodically transmits the unique address. Transmission of the address is preferably performed by modulating the illumination generated by the element into a form that is recognized as an address signal 2 but is not discernable by the human eye. Such modulation could include phase modulation, phase shift keying ("PSK"), frequency shift keying ("FSK"), amplitude modulation ("AM"), or frequency modulation ("FM"). These illustrating examples for transmitting the address are not to be construed as exhaustive because various equivalent transmitting methods within the knowledge of one skilled in the art can be used.

Preferably, the receiver 3 is portable and is built into a watch or similar piece of jewelry, a cellular telephone, or a portable or hand-held computing device such as a laptop computer or a Personal Digital Assistant (PDA). Alternatively, the receiver 3 can be configured to reside in a device that is not typically moved. In such a configuration, the receiver 3 can be used for security purposes to insure that the stationary device holding the receiver 3, i.e., a computer, remains in a particular place.

The light detector 20 in the receiver 3 can be a conventional optical detector, such as a silicon or GaAs detector, a Charged Couple Device ("CCD") detector, and/or a CCD array. As set forth below, the invention can further include a unique 3-D optical detector that determines its own position relative to a light source.

As the receiver 3 moves within a building, for example, it passes near various illumination elements 1 located within the building, many or all of which are configured to transmit the unique address signal 2. The receiver 3 is preferably configured to show its location on a display 4. The display 4 can be attached to the receiver 3 (as shown in FIG. 1). Alternatively, the receiver 3 can transmit location information to a receiver coupled to a separate display. Such a separate display can, for example, show the relative or absolute terrestrial location of every remote unit, that is receiver, in a multi-receiver system. In a first variant, the receiver 3 can determine its distance from or position relative to illumination elements 1 and forward that information (possibly along with the transmitter address) to a non-illustrated central receiver control station where the relative or absolute position of the receiver can be calculated with respect to the infrastructure or to the Earth. Regardless of the configuration, a central receiver control station could keep track of the current position of each receiver.

If a PDA is used, for example, the PDA display could show in an appropriate screen area the address of the position at which the PDA is being held, i.e., a street address. Alternatively, the PDA could show a map identifying the PDA's location with a unique location identifier marking the spot upon which the PDA is situated, i.e., an "X" on a street map. Alternatively, the PDA could show a floor plan of the building in which the PDA is being held with a location identifier indicating the position of the PDA. These are not the only examples of such a location display 4. Various equivalent display methods known to one skilled in the art can also be implemented to show the location of the receiver.

Once the receiver 3 detects an appropriate signal 2 from a light, it determines a received signal strength (RSS, also received signal power) based upon conventional light power detection technologies. For example, if the transmission power of the light source is known and the receiver 3 can determine the received signal power, the receiver 3 can then determine the two-dimensional distance from that light source based upon conventional formulas for determining distance based upon the attenuation of the light signal. The receiver 3 simultaneously determines the unique address of the detected illumination element 1 by demodulating the signal 2 from light received, for example. An example method of demodulation is disclosed in co-pending patent application titled "Interference-Robust Coded-Modulation Scheme for Optical Communications and Method for Modulating Illumination for Optical Communications," filed Dec. 8, 2000, as U.S. application Ser. No. 09/733,717 and assigned to Motorola, Inc., which is hereby incorporated herein by reference. Once the address of the detected illumination element 1 is obtained, the receiver 3 determines the relative or absolute position of the illumination element 1 (also called a transmitter) and corrects its own position using the position obtained from the RSS analysis. The corrected position, therefore, pinpoints the receiver's 3 relative or absolute position in relation to the building layout or to a point on the Earth, for example, within a certain radius from the transmitter 1. The receiver 3 can then display the relative or absolute position of the receiver 3 to the user or forward that information to a separate display device and/or to a control station.

The 3-D optical detector 20 of the invention improves the above-mentioned use of a conventional light detector 20 by generating more accurate measurements used to define the exact three-dimensional location of the transmitter 1 from the receiver 3. The 3-D optical detector 20 will be defined in further detail below.

In order to detect an appropriate signal, the infrastructure of the system must be defined. As set forth above, an existing indoor-lighting infrastructure, for example, is modified so that each room or area of a structure includes at least one transmitter 1, each of which having a unique address or identification and transmitting that address to the receiver 3. The relative or absolute position of each of the transmitters 1 is known.

In the preferred embodiment, the receiver 3 is connected to a list structure 5. The list structure 5 is a database that holds two related pieces of information, a unique address 6 for each light transmitter 1 in the infrastructure and a position 7 associated with each light transmitter 1.

The list structure 5 is generated at the time system implementation begins. Preferably, the list structure 5 is updated to include new light transmitters 1 added to the infrastructure, to modify old light transmitters moved to a new location, or to delete old light transmitters removed from the infrastructure. The list structure 5 can reside in the receiver 3 itself, or at a central station where, for example, the receiver can access the list structure 5 through a transmission link 8. Whether or not the receiver 3 stores the list structure 5, the list structure 5 is preferably periodically updated. Such an update in the receiver 3 can be done, for example, by modem linking 8 the receiver 3 to a central computer or station 9 housing the most current version of the list structure 5. The link 8 can be an RF link, an optical link, and/or an acoustic link. The link 8 can be made through an Internet connection (World Wide Web), a direct cellular link, a satellite link, or through the lighting infrastructure itself.

The list structure 5 update can include replacing the entire updated list structure 5 in the receiver 3 or saving only changes made to the list structure 5 since the last update was performed. Accordingly, when a particular light transmitter 1 is detected, the receiver 3 performs a list/database lookup to determine the relative or absolute location 7 of that light transmitter 1. Based upon the location 7 of that light transmitter 1, the receiver 3 then can begin to determine its approximate location.

In the first variant of the present invention, the receiver 3 receives and decodes the address of the light transmitter 1 and determines the distance from, or position relative to, the light transmitter 1 and transmits that information in a position signal to the central receiver control station wherein the information is processed to determine the absolute terrestrial position, or a position relative to another coordinate system such as a structure.

In order to determine the exact location of the receiver 3 based upon light received from an illuminating element 1, a system needs to have information from which it can extract a three dimensional position with respect to that element 1. Most existing location systems need at least three, and, preferably, four, transmitting devices to calculate a two-dimensional position. In a preferred embodiment of the invention, the receiver 3 includes a 3-D optical detector 20 that is used to correct and enhance the approximate relative or absolute location from the corresponding relative or absolute location 7 of the detected transmitter 1. The 3-D receiver 20 used by the invention is unique because it determines its own three-dimensional position with the help of only a single transmitting device 1.

Figure 2:
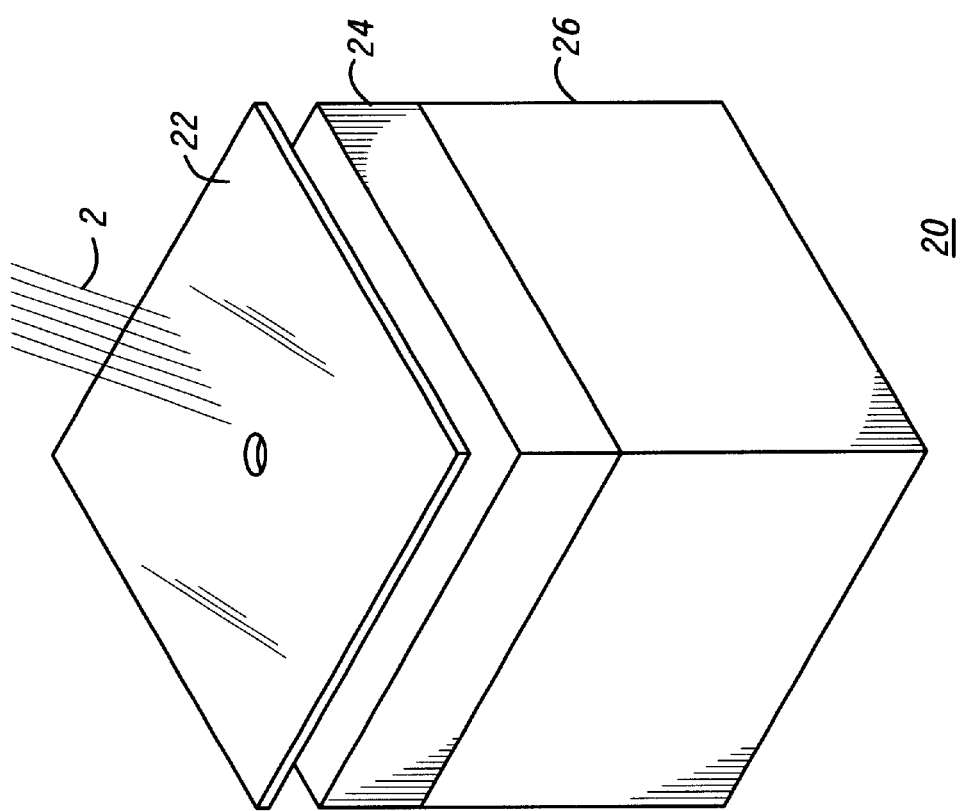
FIG. 2 is a perspective diagrammatic representation of a receiver according to the invention.
Figure 3:
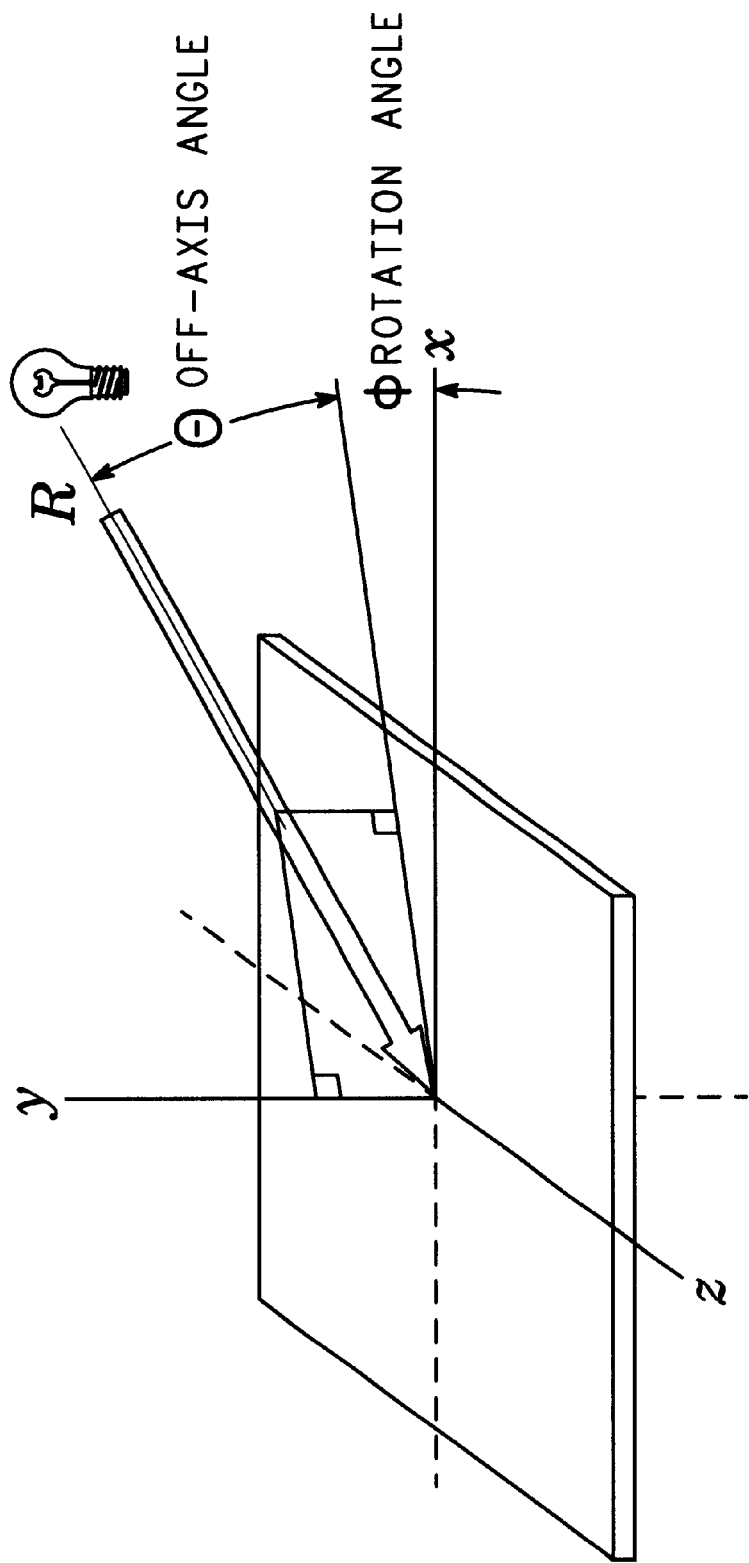
FIG. 3 is a perspective diagrammatic representation of the CCD array of the receiver of FIG. 2.
Figure 4:
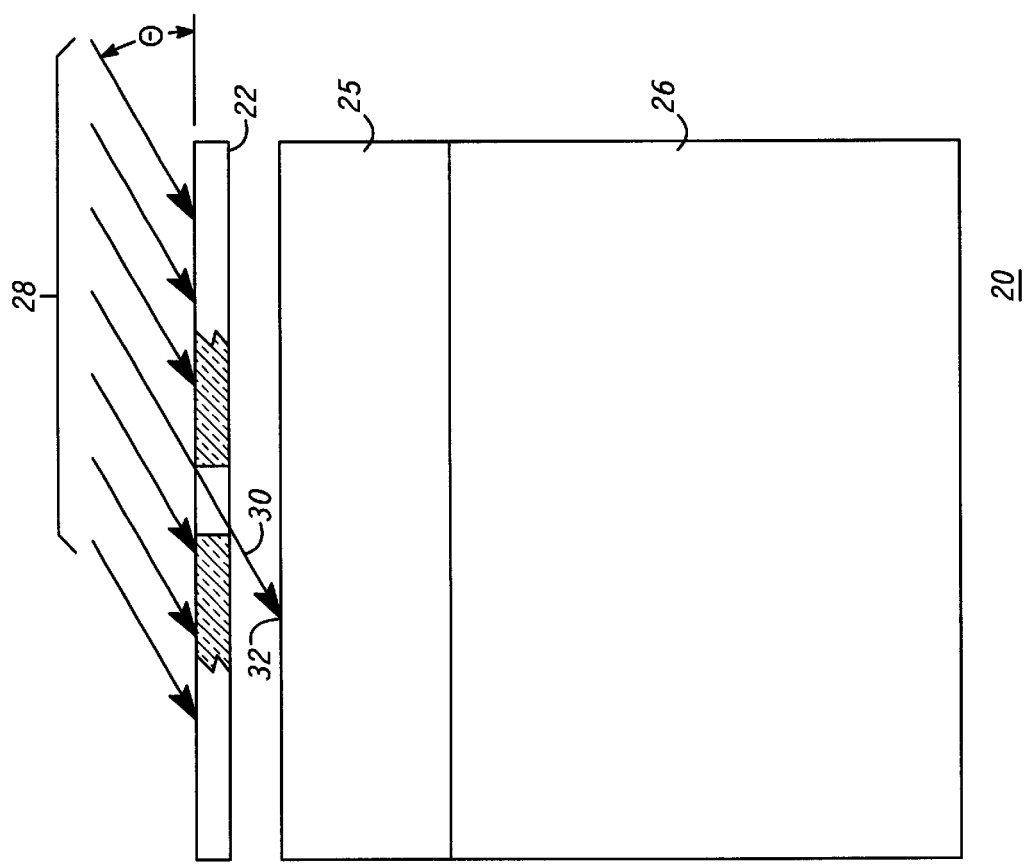
FIG. 4 is a side view of the receiver of FIG. 2 with a partial cross-section of the lens.

Shown in block diagram in FIGS. 2 and 4 is a unique Spot Collimating Lens and Charged Couple Device ("SCL-CCD") structure 20 that provides significant features of the 3-D receiver 3. The SCL-CCD 20 includes a pinhole lens 22 (shown in cross-section in FIG. 4), a CCD array coupled to a analog-to-digital (A/D) converter, and a basic processor 26. The combination of these elements yields a device that determines the off-axis ($\theta$) and rotational angle-of-arrival ($\phi$) of most optical signals. See FIG. 3. The lens 22 is used to collimate a light signal 28 into a spot that is detected on the CCD array 24. The CCD array 24 is a planar matrix of individual photodetector elements, each of which are mapped to a specific value of $\theta$ and $\phi$. When a specific array element is excited by a column of light 30 that has been filtered from the light signal 28, it can be calculated that the column of light 30 came from the corresponding angles $\theta$ and $\phi$ with respect to the receiver 3. The SCL-CCD 20 also can determine the RSS of the transmitter 1 using conventional light power-sensing technologies. The RSS is used to supplement the SCL-CCD 20 measurements by adding another distance measurement.

FIG. 4 shows a side view of the SCL-CCD 20 in operation in an example where the incident angle of arrival ($\theta$) of the light 2 is small and arrives from the right side of the detector 20. If the cross-section of the pinhole of the lens 22 in FIG. 4 is extended entirely through the CCD array 24, for example, the view in FIG. 4 is a view of one CCD column 25. Thus, the collimated beam 30 excites an array element 32 on the left half of the CCD column 25. Preferably, the beam 30 excites a single element 32 of the column 25. As the angle of incidence ($\theta$) increases, the collimated beam 30 moves toward the center of the CCD column 25. Finally, when the angle of incidence (AoA) is normal to the surface of the detector (i.e., $\theta=90°$), the collimated beam 30 is centered on the CCD column 25. Because individual incident angles of arrival correspond to specific points on the CCD column 25, each element on the left side of the CCD column 25 is mapped to a particular off-axis angle $\theta$ for a light 2 originating on the right side of the CCD column 25, for example. The converse algorithm is applied to a light 2 that arrives from the left side of the CCD column 25.

The SCL-CCD 20 of the invention, however, involves a two-dimensional planar CCD array 24. Thus, as a light 2 moves off of the X-axis in either direction of the Z-axis, as shown in FIG. 3, the collimated beam 30 excites a CCD element 32 that is not located on the X-axis. The angle between the X-axis and a line drawn between the CCD array 24 center point and the exited CCD element 32 defines a rotation AoA ($\phi$). Thus, the above-mentioned mapping algorithm is extended in two dimensions to map every pixel to each possible off-axis angle ($\theta$) and rotational angle-of-arrival ($\phi$). Using the off-axis angle ($\theta$), the rotational angle-of-arrival ($\phi$), and the RSS of the optical signal 2, a quite accurate position vector is determined when the orientation of the y axis of the SCL-CCD 20 with reference to the coordinate system used to define the absolute or relative location of the transmitter 7 is either predetermined or determined when the position vector is determined. For example, the position of the SCL-CCD 20 can be properly determined when the SCL-CCD 20 is known to be oriented vertically while the angles $\theta$ and $\phi$ are measured. The position vector defines the 3-D position of the receiver 3 with respect to the source 1 of the optical signal 2.

Figure 5:
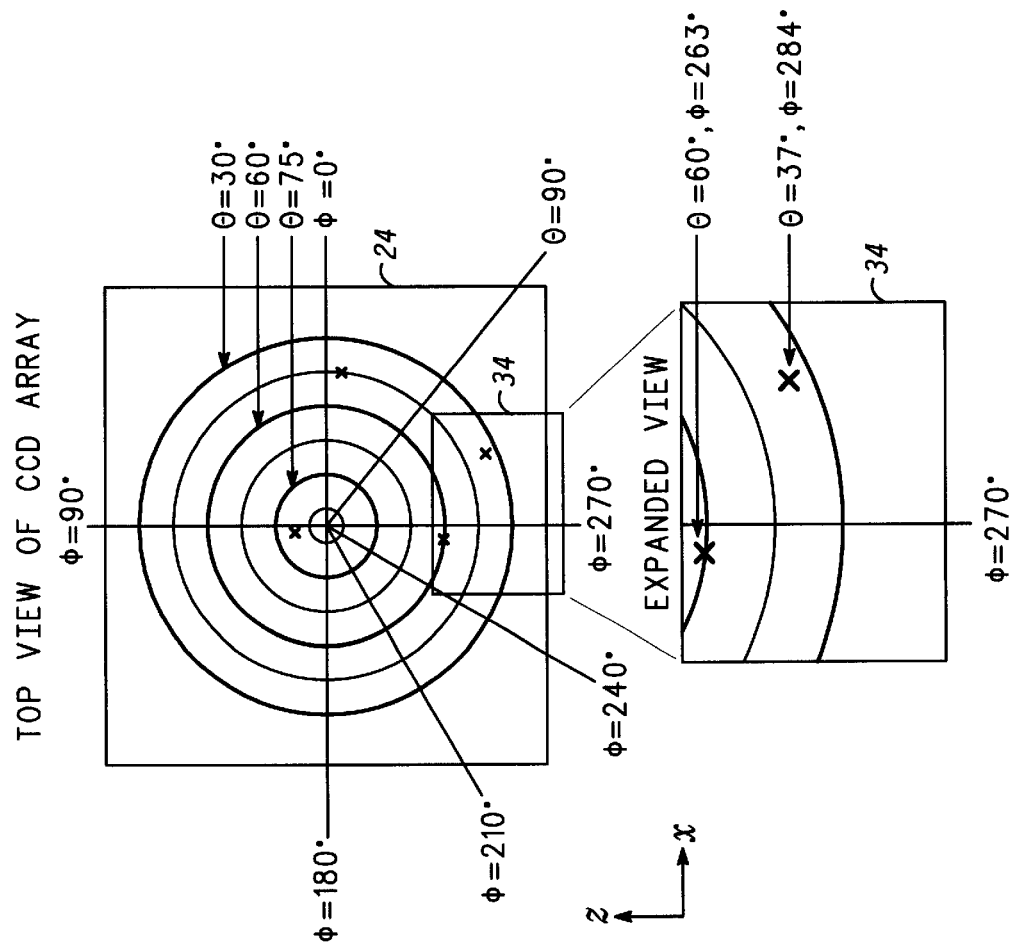
FIG. 5 is a diagrammatic plan view of the CCD array of FIG. 3.

The algorithm for mapping the off-axis angle ($\theta$) and the rotational angle-of-arrival ($\phi$) to each element of the CCD array can also be represented by an imaginary rotation of the 2-D off-axis AoA ($\theta$) onto the X-Z plane as shown in FIG. 5. In order to extend the CCD mapping to signals that arrive from anywhere in the 3-D space above the detector plane 22, the array column on the X-axis is "rotated" so that it creates a map of concentric circles on the face of the CCD array 24 as shown in FIG. 5. The concentric circles enable the measurement of a rotational AoA ($\phi$). If the positive X-axis is designated as a zero-degree (0°) line for calculating the rotational AoA, a rotational angle ($\phi$) can be determined for any detectable signal 2 by measuring the angle between a line drawn between the excited element of the array and the array center point and the positive X-axis. The example shown in FIG. 5 illustrates how four optical signals (each indicated by an "X") may excite several areas of the detector 20 simultaneously. An area 34 of the array 24 including the bottom two X's has been magnified in order to show how accurate the detector 20 of the invention can be in determining θ and φ.

Another set of measurements can be considered. Additionally, or alternatively, the receiver 3 can make TDoA measurements and determine its position based on the time that each signal arrives at its detector 20. If, for example, the light signals 2 are transmitted from every illumination element 1 at the same time, a receiver 3, having a time clock synchronized with such transmissions, could determine the time that it took for the received signal 2 to arrive at the receiver 3. The receiver 3 then converts the time delay into a distance measurement in a conventional way. The drawback to this alternative technique is a requirement for the transmitters to be synchronized. Although synchronization of transmitters is neither difficult nor expensive, the feature does increase the complexity of the system.

Figure 6:
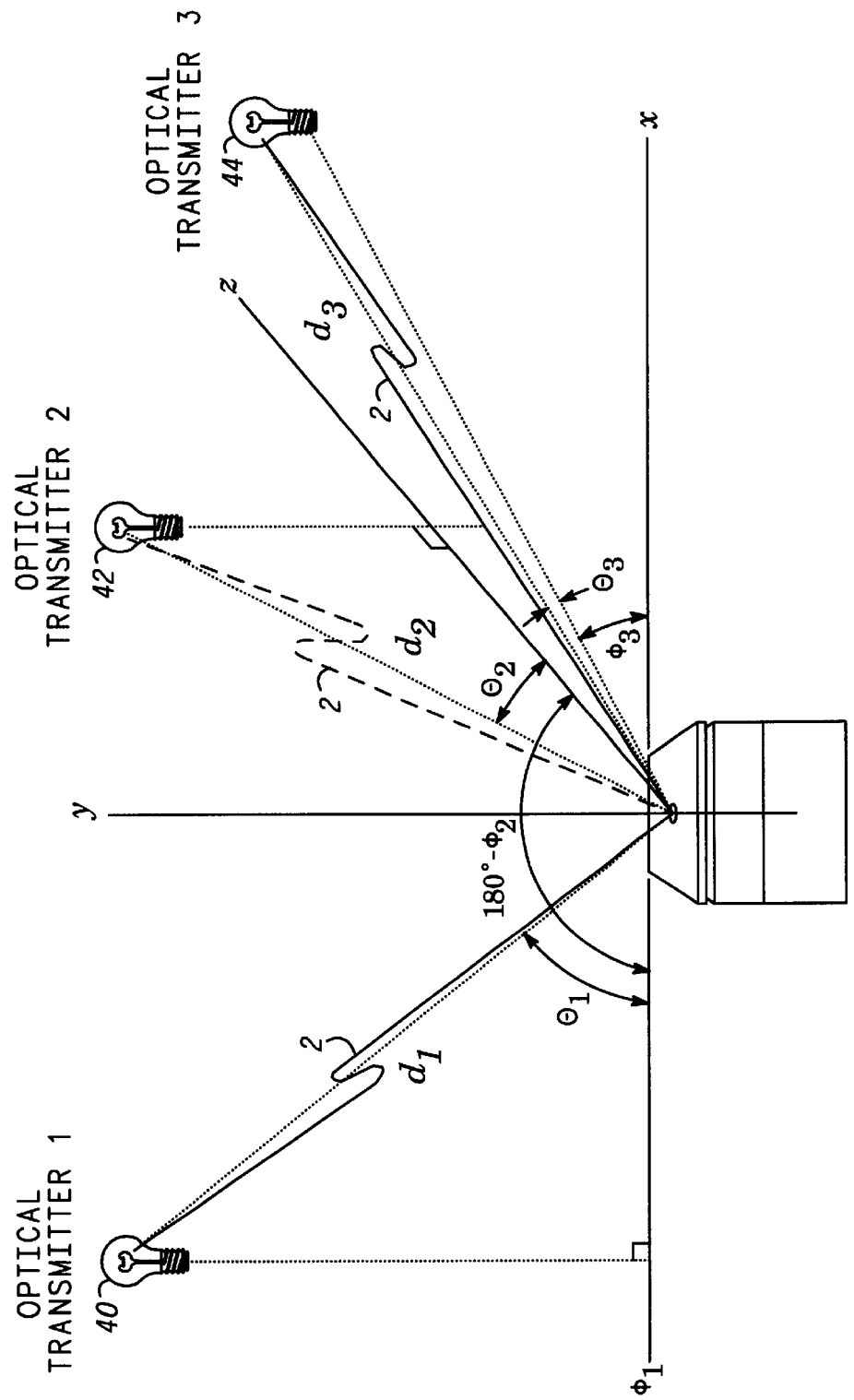
FIG. 6 is a perspective diagrammatic representation of the receiver of FIG. 2 in an example lighting infrastructure.

The combination of elements 22, 24, 26 in the receiver 20 gives it the capability to detect the 2-D AoA and RSS measurements that are necessary to determine a 3-D position of a transmitter 1. An illustration of how the receiver 3 might be used to determine its position with respect to multiple light sources 1 in the infrastructure described above and shown in FIG. 1 is taken, for example, from the lighting scenario shown in FIG. 6. The light bulbs represent three optical transmitters 40, 42, 44 of an in-building lighting infrastructure (i.e., fluorescent or incandescent lights), each of which periodically transmits a unique address signal 2 within the light emitted. Once the receiver 3 detects each signal 2, measurements are made to determine the origin of each signal 2 as set forth above.

Upon determining its relative location to each light transmitter 1 detected by the receiver 3, the receiver 3 displays 4 a highly accurate relative or absolute location of the receiver 3 to the user or forwards that information for display on a central display unit and/or a central control station. Thus, based on a priori knowledge of the location of each transmitter 1, a relative or absolute position of the receiver 3 is determined to a great degree of accuracy.

The invention has many uses. One example of how the device of the invention might be used is in concert with the E-911 framework. In the E-911 framework, the system of the invention gives authorities an exact location of an emergency (based upon receiving a transmission from a receiver 3 located at that emergency) in a very short time period. Also, the invention can be used by firefighters for locating their own position at a structure and/or a position of others at the structure who are in need of the firefighters' assistance. Further, the invention can be used by law enforcement for covertly tracking fleeing individuals carrying a receiver of the invention. The invention also can be used for asset tracking. In this embodiment, the receiver is placed on an object (i.e., a computer or a car), and a central location station can monitor the object as it moves from the detectable range of one transmitter to another. Alternatively, the invention can be used as a service request locator. When an individual desires service personnel (i.e., a waiter), the individual can press an appropriate switch and the service personnel will be simultaneously notified of the request and the location of the individual. The invention can be used for providing directions to a user. When a user is lost and needs guidance through streets, for example, the invention can transmit a position to the system, which, in turn, sends directions back to the user. Finally, the invention can be used for personal security. If a person is in trouble and is in need of assistance, the invention can be used to transmit the person's location to an ambulance or to law enforcement for appropriate rescue.

Although the invention is illustrated and described herein as embodied in an optically-based location system and a method for determining a location at a structure, it is nevertheless not intended to be limited to the details shown because various modifications and structural changes may be made therein without departing from the spirit of the invention and within the scope and range of equivalents of the claims.

What is claimed is:

1. A method of determining a location at a structure, which comprises:

providing a lighting infrastructure having transmitters each optically transmitting a respective relative position of that transmitter with respect to a fixed position;

detecting the respective relative position of at least one of the transmitters using an optical receiver having a three-dimensional optical detector;

determining a relative three-dimensional position of the receiver from the detected relative position;

calculating a difference between a time at which the receiver received a relative position from each of the detected transmitters and a time at which each of the detected transmitters transmitted the relative position to produce a delay time;

converting the delay time into a distance measurement for calculating a distance between each of the detected transmitters and the receiver; and mapping a specific off-axis angle and rotational angle-of-arrival based on the calculated distance between each of the detected transmitters and the receiver.

2. The method according to claim 1, wherein the transmitters are selected from the group consisting of ultraviolet, infrared, and visible emission devices in the lighting infrastructure.

3. The method according to claim 1, which further comprises performing the step of determining the relative position of the receiver by determining a two-dimensional position of the receiver relative to at least one of the detected transmitters.

4. The method according to claim 1, which further comprises performing the step of determining the relative position of the receiver by determining a three-dimensional position of the receiver relative to at least one of the detected transmitters.

5. The method according to claim 1, which further comprises performing the step of determining the relative position of the receiver by comparing a received signal strength of at least one of the detected transmitters with a transmitted signal strength.

6. The method according to claim 1, which further comprises synchronously transmitting the respective relative position of the transmitters from the transmitters.

7. The method according to claim 1, which further comprises performing the step of determining the relative position of the receiver by transmitting the relative position of the detected transmitters to a central station and determining the receiver's position with the central station.

8. An optically-based location system, comprising:

a lighting infrastructure having optical transmitters each configured to illuminate and to transmit a respective relative position of said transmitters with respect to a fixed position;

an optical receiver configured to detect at least one of said transmitters and to determine from the detection a relative position of said receiver;

wherein said receiver has a three-dimensional optical detector for determining three-dimensional positions of said receiver relative to a plurality of said transmitters that are transmitting light simultaneously, the three-dimensional optical detector being a three-dimensional spot-collimating lens and charged couple device optical detector, the three-dimensional spot collimating lens and charged couple device optical detector having a pin hole lens, a charged couple device array with an analog-to-digital converter, and a processor for determining an off-axis angle and a rotational angle-of-arrival of a detected optical signal, said pin hole lens configured to collimate received light into a spot to be detected by said charged couple device array, the charged couple device array being a planar matrix of individual photodetector elements, and each of said photodetector elements being mapped to a specific off-axis angle and rotational angle-of-arrival.

9. The system according to claim 8, wherein said lighting infrastructure is inside a structure.

10. The system according to claim 8, wherein said transmitters are lights in said lighting infrastructure.

11. The system according to claim 8, wherein said lighting infrastructure includes fluorescent lights each with a ballast, and each of said transmitters is part of a ballast of said fluorescent lights.

12. The system according to claim 8, wherein said transmitters are configured to transmit said respective relative position through emitted light.

13. The system according to claim 8, wherein said transmitters are configured to transmit said respective relative position through modulation of emitted light and said receiver is configured to demodulate said respective relative position from the emitted light.

14. The system according to claim 8, wherein each of said transmitters is a fluorescent light controlled by a unique ballast effecting a periodic transmission of said respective relative position through emitted fluorescent light.

15. The system according to claim 14, wherein said unique ballast is configured to control power supplied to said fluorescent light for varying illumination into a form recognized by said receiver as said respective relative position.

16. The system according to claim 8, wherein said unique ballast is configured to modulate illumination from said fluorescent light into a form recognized by said receiver as said respective relative position.

17. The system according to claim 8, wherein said transmitters have a transmit signal strength and said receiver has an optical power detector for detecting a received signal strength and for comparing said received signal strength to said transmit signal strength to form a distance measurement.

18. The system according to claim 8, wherein said receiver is portable.

19. The system according to claim 8, wherein said receiver is located in a device selected from the group consisting of a piece of jewelry, a cellular telephone, and a portable computing device.

20. The system according to claim 19, wherein said portable computing device is one of the group consisting of a laptop computer and a personal digital assistant.

21. The system according to claim 8, including a display connected to said receiver for showing a relative position of said receiver.

22. The system according to claim 8, wherein said receiver has a display for showing a relative position of said receiver.

23. The system according to claim 8, wherein said receiver has at least one of the group consisting of a silicon detector, a GaAs detector, a charged coupled device detector, and a charged couple device detector array.

24. The system according to claim 8, wherein said receiver has a three-dimensional optical detector for determining a three-dimensional position of said receiver relative to a single one of said transmitters.

25. The system according to claim 8, wherein said receiver and said transmitters each include a synchronized timer for synchronously communicating said respective relative position.

* * * * *